March 2, 1965 D. E. BLACK 3,171,419
METHOD OF REPAIRING PLASTIC PIPE
Filed Dec. 27, 1960 3 Sheets-Sheet 1
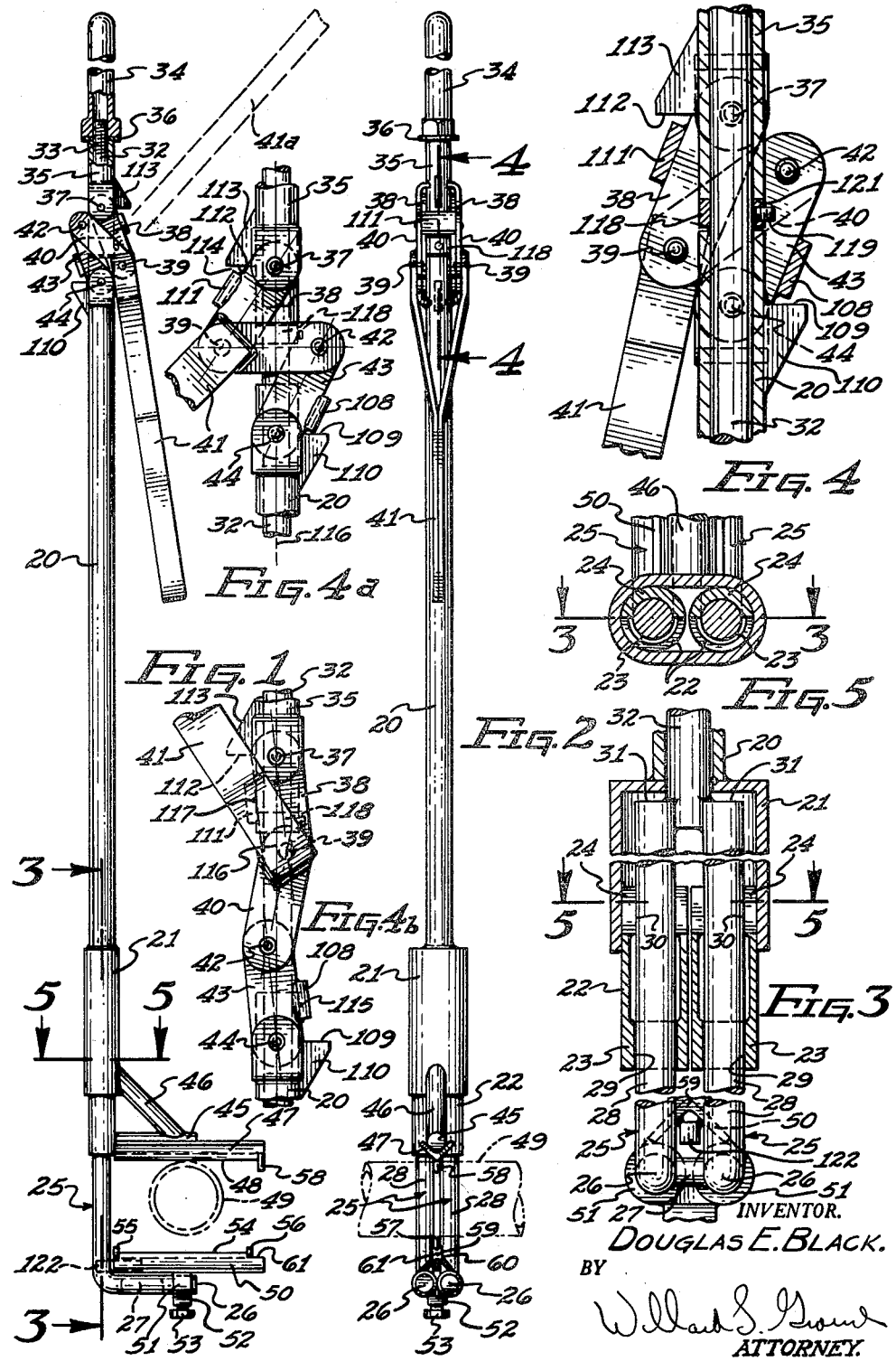
INVENTOR.
DOUGLAS E. BLACK.
BY
ATTORNEY.

INVENTOR.
DOUGLAS E. BLACK.
BY
Willard S. Grout
ATTORNEY.

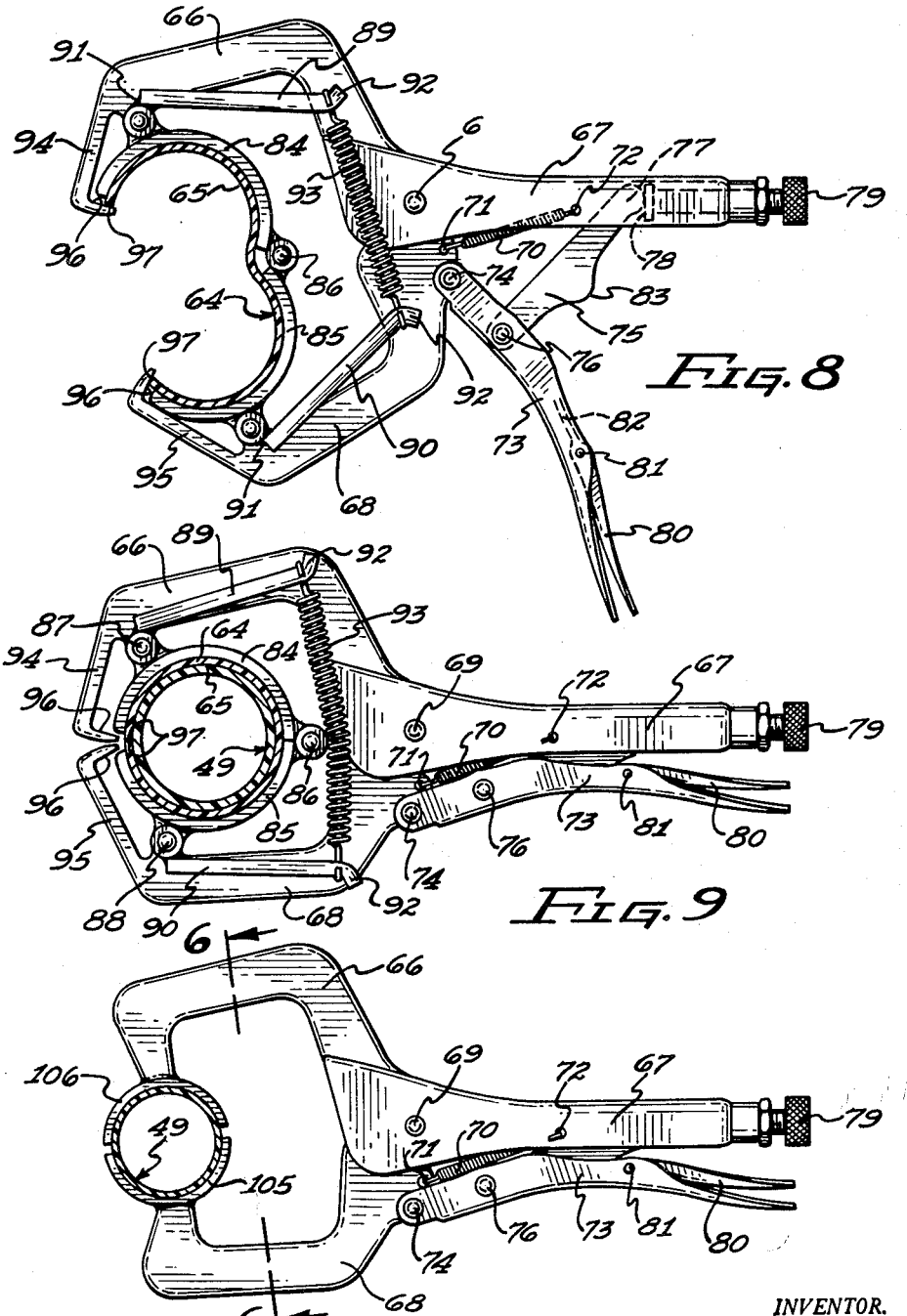

United States Patent Office 3,171,419
Patented Mar. 2, 1965

3,171,419
METHOD OF REPAIRING PLASTIC PIPE
Douglas E. Black, 2044 W. Palo Verde Drive, Phoenix, Ariz., assignor of twenty-two and one-half percent each to James B. Ledford and Quinton R. Ford and five percent to Joseph J. Bangora, all of Phoenix, Ariz.
Filed Dec. 27, 1960, Ser. No. 78,696
4 Claims. (Cl. 137—15)

Plastic pipe carrying natural gas and other fluids presents many problems. Among these problems was the fact no suitable or safe way was heretofore available for shutting off the flow in the plastic pipe when an emergency arose, except to go to a valve which might shut down a large number of customers between the valve and the break in the line. Most breaks are caused by workers excavating or running ditches across the plastic lines.

One of the objects of the present invention is to provide a method for controlling a plastic pipe line for making repairs with a minimum of effort and time being expended and with a maximum of safety for the workers repairing the line.

Another object is to provide a method of repairing plastic pipe by which one may reach down in a trench and grip a plastic pipe line behind the break and immediately shut off the gas and to proceed to repair the break without inconvenience to customers who might otherwise have been shut off by the prior methods. Should the break be in a service line only then only a particular customer would be out of gas for a short time while repairs were made.

Previous to the instant developments it was the practice to sometimes repair a damaged pipe line "hot" or by jumping in a new section of pipe without shutting off the flow of gas. Such unsatisfactory and unsafe procedures are completely eliminated by the present method.

Another object of this invention is to provide a method for repairing plastic pipeline which makes possible a cheaper installation of the pipeline as no valves are necessary in a plurality of places as in former practice and the problems of sticking valves and their improper operation are avoided.

Another object is to provide a plastic pipe control method which greatly improves public safety by being able to shut off the fire hazard of escaping gas during national emergencies and catastrophies.

Further features and advantages of this invention will appear from a detailed description of the drawings in which:

FIG. 1 is a side elevation of a plastic pipe squeezing device incorporating features of this invention.

FIG. 2 is a front elevation of the device shown in FIG. 1.

FIG. 3 is a fragmentary enlarged section on the line 3—3 of FIGS. 1 and 5.

FIG. 4 is a fragmentary enlarged section on the line 4—4 of FIG. 2.

FIG. 4a is an enlarged view showing the toggle linkage in intermediate position.

FIG. 4b is an enlarged view showing the toggle linkage in overcenter locked position.

FIG. 5 is a fragmentary enlarged section on the line 5—5 of FIGS. 1 and 3.

FIG. 7 is an enlarged section of the apparatus shown on the line 7—7 of FIG. 6.

FIG. 8 is a side elevation of a pipe patch clamp shown in open position.

FIG. 9 is a side elevation of the pipe patch clamp of FIG. 8, shown in closed clamping position.

Figure 6:
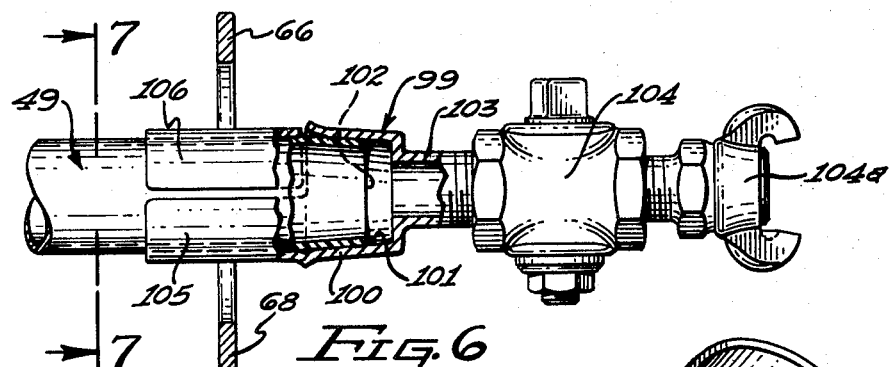
FIG. 6 is an enlarged section of a pipe stopper, indicated on the line 6—6 of FIG. 7, utilized in connection with this invention.

As an example of one embodiment of this invention there is shown in FIGS. 1 to 5, inclusive, a pipe squeezing and shutting off tool comprising a hollow tubular body member 20 to the lower end of which is fixed the elongated oval casing 21. To the lower end of the casing 21 is fixed the guide bushing sleeves 22 which in turn has the guide bushings 23 fixed to its lower end and the half-bushings 24 fixed to its upper end. A pair of L-shaped jaw members 25 have horizontal portions 26 securely welded together at 27, and vertically disposed portions 28 which slide axially in the bores 29 and 30 of the bushings 23 and 24. The upper ends 31 of the portions 28 of the L-shaped member 25 are rigidly fixed to the lower ends of the operating rod 32 which extends upwardly through the tubular body member 20.

The operating rod 32 may be reciprocated relative to the body member 20 by any suitable manually operated or power operated mechanism. One example of such mechanism is that shown in FIGS. 1, 2, 4, 4a and 4b wherein the upper end of the rod 32 is provided with threads 33 upon which is adjustably threadedly mounted the handle 34. A sleeve 35 is slidably mounted on the operating rod 32 and has its upper end in abutting contact with the thrust washer 36 which in turn abuts the lower end of the handle 34. The handle 34 is provided for gripping and manipulating the pipe squeezer in presenting it on the pipe to be squeezed. It further provides the adjusting means for setting the pipe engaging elements before squeezing the pipe. The sleeve 35 is pivotally connected at 37 to a pair of toggle links 38 which in turn are pivotally connected at 39 to a pair of operating links 40 to which is fixed the operating lever 41. The other end of the operating links 40 are pivotally connected at 42 to toggle links 43 which in turn are pivotally connected at 44 to the upper end of the body member 20. When the operating lever 41 is in lowered position as shown in FIGS. 1 and 2, sleeve 35 is lowered to allow the rod 32 to drop the jaw members 25 to lowered position.

Gripping the handle 34 with one hand, the operating lever 41 is gripped with the other hand and the squeezer placed over the pipe 49. The lever 41 is then swung upwardly so that the toggle links are moved to the intermediate position shown in FIG. 4a. As the lever 41 is initially raised the cross bar 108 of the links 43 engages the abutment surface 109 of the lug 110 rigidly fixed to the tubular body member 20. In the initial raising of the lever 41 the cross bar 111 of the links 38 may engage the abutment surface 112 of the lug 113 fixed to the sleeve 35 to initiate the operation of the toggle linkage as the operating lever 41 is raised. The cross bars 108 and 111 are so positioned relative to their respective lugs 108 and 111 so that both cross bars do not simultaneously engage the lug during operation of the lever 41 but slight clearance is provided as at 114 in FIG. 4a to prevent binding of the linkage.

When the lever 41 is swung upwardly to position 41a, as shown in FIG. 4b, the toggle links are straightened out and moved just over center to hold sleeve 35 in upper position against the thrust washer 36 and handle 34 causing the jaw members 25 to be moved and locked in raised position. Under these conditions cross bar 108 engages the tubular body member 20 at the point to stop the pivot connection 42 over center, to the left of the center line 116, FIG. 4b, of relative movement of the member 20 and operating rod 32. Similarly, the cross bar 111 engages the sleeve 35 at the point 117 to stop the pivot connection 39 over center, to the right of the center line 116, FIG. 4b. Thus both sets of toggle links 43–40 and 38–40 are locked in overcenter position with the pipe fully squeezed shut. A stop collar 118 locked to the operating rod 32 by a suitable set screw 119 is engaged by the bottom end 121 of the sleeve 35 just as the toggles 43–40 and 38–40 are moved out of overcenter locking position as lever 41 is moved back to open released position so as to positively move the rod 32 downwardly to open position.

Figure 12:
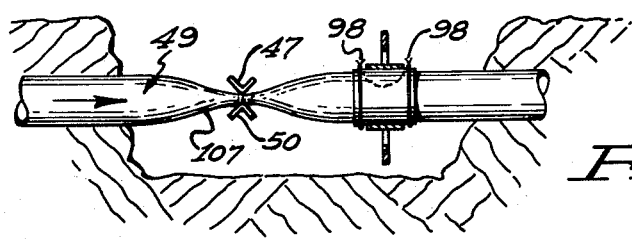
FIG. 12 is a view, similar to FIG. 11, showing the pipe squeezed off and a patch applied.
Figure 13:
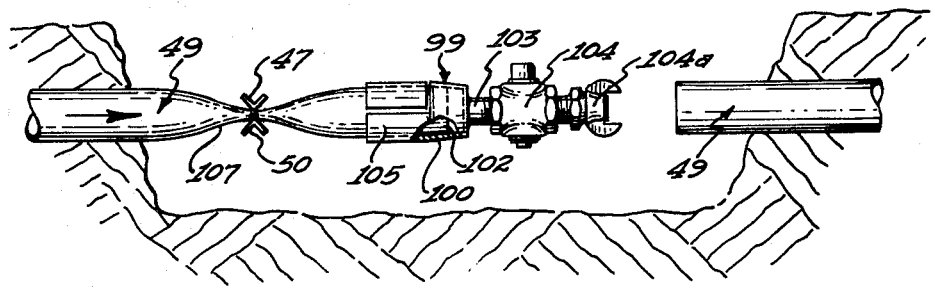
FIG. 13 is a view similar to FIG. 11 but showing the pipe squeezed off and a pipe stopper applied to the end of the pipe.

Fixed to the guide bushing sleeves 22 is the horizontally outwardly extending bracket 45 to which is fixed the strut 46 which is also fixed to the casings 21. A V-shaped pipe engaging anvil piece 47, FIGS. 2, 12 and 13, is rigidly fixed to the bracket 45 and has a slightly rounded pipe engaging knife edge 48 adapted to engage the plastic pipe 49. Mounted on the horizontal portions 26 of the L-shaped jaw members 25 is the pipe engaging V-shaped member 50, FIGS. 2, 12 and 13, having fixed thereto a pair of support rings 51, which loosely fit over the horizontal portions 26. A block 52 fixed to the rings 51 and carrying a screw 53 serves to position the pipe engaging member 50 to the L-shaped jaw members 25 so that the V-shaped member 50 is free to rock on the horizontal portions 26. The L-shaped members 25 are bent a few degrees beyond 90 degrees to allow for the normal spring or give in the L-shaped members 25 during the squeezing operation to take care of variations in the setting of handle 34 for over-center locking of the toggle and the pipe engaging member 50 is rockingly held in place by the rings 51 and lug 122 on the portions 26 of the members 25 to thus effect proper seating of the edge 54 on the pipe relative to the cooperating edge 48 of the anvil. The pipe engaging member 50 has a slightly rounded pipe engaging edge 54 and adjacent angularly related side faces adapted to engage the pipe 49 at diametrically opposite positions from the point of engagement of the pipe engaging edge 48 with the pipe. The guide lug 122 is fixed to the pipe engaging member 50 and slides up-and-down between the jaw members 25 to maintain the pipe engaging edge in alignment with the pipe engaging edge 48.

In order to prevent damage to the pipe when it is squeezed between the pipe engaging edges 48 and 49, there is provided a pair of stop lugs 55 and 56 having upwardly facing V-notches 57 which receive each end of the pipe engaging edge 48 of the anvil 47 so that when the toggle operated by the lever 41 is locked in overcenter squeezed position for the pipe, FIG. 4b, the stop lugs 55 and 56 hold the pipe engaging edges 48 and 54 spaced an accurate parallel distance apart equal to substantially twice the wall thickness of the pipe 49. Further, in order to maintain the pipe engaging edges 48 and 54 in the same vertical plane during the squeezing operation there is provided a downwardly extending guide pin 58 fixed to the outer end of the pipe engaging anvil 47 which enters the slot 59 formed by the vertical sides 60 and 61 in the outer end of the pipe engaging member 50.

Figure 11:
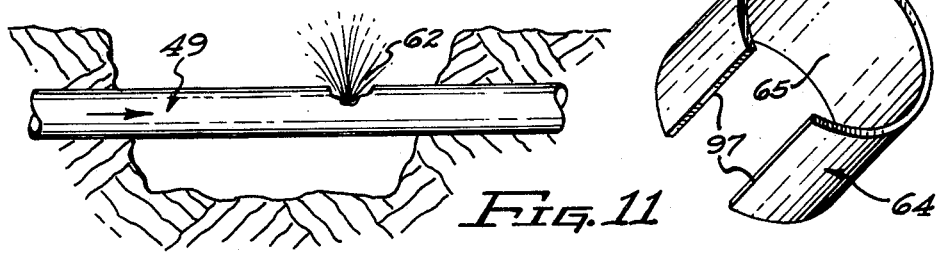
FIG. 11 is a view showing a damaged plastic pipe about to be repaired.
Figure 10:
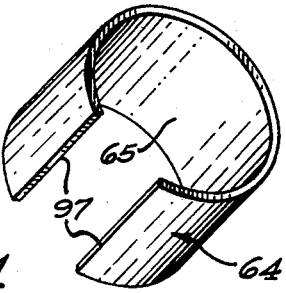
FIG. 10 is an enlarged perspective view of a plastic pipe patch and coupling member.

In repairing a damaged pipe 49 in an emergency having a break 62, FIG. 11 for example, the pipe squeezing tool shown in FIGS. 1 to 5 is applied to the pipe to squeeze it off as shown in FIG. 12. The break 62 may then be repaired by placing a patching member 64, FIG. 10, over the break 62 and clamping the patch in place after applying suitable plastic cement to the outside pipe surface and the inside surface 65 of the patch.

The patch 64 is preferably applied by a novel patch applier and clamp device as shown in FIGS. 8 and 9, comprising a first clamp arm 66 having an integral handle 67 to which is pivotally mounted a second clamp arm 68 by a suitable pin 69. A tension spring 70 interconnected at 71 with the second clamp arm 68 and at 72 with the handle 67 serves to normally swing the clamp arms 66 and 68 to open position away from each other. A suitable toggle actuating mechanism is provided for swinging the arms 66 and 68 relative to each other and to lock them in closed clamping position, such mechanism comprising the operating lever 73 pivotally mounted at its inner end on a pin 74 carried in the arm 68. A toggle link 75 is pivotally mounted at one end on a pin 76 intermediate the ends of the operating lever 73, the other rounded end 77 of the toggle link 75 engaging the inner end 78 of the adjustable abutment screw 79 carried in the outer end of the handle 67. A toggle release lever 80 is pivotally mounted on a pin 81 on the operating lever 73 and has an extension portion 82 adapted to engage the abutment lug 83 of the toggle link 75 to release the toggle pivots 74–76–77–78 from over center clamping position, FIG. 9, when desired.

Arcuate semi-cylindrical patch holding and applying jaws 84 and 85 are pivotally hinged together by a pin 86, jaw 84 being pivotally connected by a pin 87 to the outer end of the arm 66 while the jaw 85 is pivotally connected by a pin 88 to the outer end of the arm 68. Rods 89 and 90 are fixed at 91 to the respective jaws 84 and 85 and extend rearwardly and terminate in bent ends 92 between which is connected a tension spring 93 whereby the jaws 84 and 85 are normally swung to open position on the pivot pins 87 and 88 as the arms 66 and 68 are swung to open position by the handle 67 and lever 73. Fixed to the outer ends of the arms 66 and 68 are the pick fingers 94 and 95 having turned over end surfaces 96 adapted to engage the edges 97 of the patch member 64 when the device is in open position as shown in FIG. 8. As the device is closed about the pipe 49 to be repaired and sealed, the jaws 84 and 85 relatively move with respect to the arms 66 and 68 so as to automatically cause the pick fingers 94 and 95 to withdraw from the edge 97 of the patch member 64, allowing it to properly seat itself in sealing relationship about the pipe, this action being due to the pivot position 86 of the hinged jaws 84 and 85 being offset from the pivot pin 69 of the arms 66 and 68 of the device. If desired, suitable clamp wires 98 may be applied around the ends of the patch member 64 after it has been applied to the pipe as in FIG. 9, so that the unit may be released for other work without waiting for the plastic cement to set up.

In certain instances, FIG. 13, it may be desired to cut off the damaged pipe portion after the pipe squeezer, FIGS. 1 to 5, has been applied. A pipe stopper indicated generally at 99 may then be applied to the end of the pipe so that the pipe squeezer may then be released for further use elsewhere. The pipe stopper 99 may preferably comprise a pipe end engaging portion 100 having a slightly tapered bore 101 adapted to be slipped over the end 102 of the pipe 49 and having a threaded pipe nipple 103 to which may be connected a suitable shut-off valve 104 and a discharge hose coupling 104a. The pipe stopper 99 is clamped to the pipe 49, with valve 104 open, by means of a toggle clamp similar to that described in FIG. 8 in which the arm 68 is rigidly fixed to the integral arcuate semi-cylindrical extension 105 of the pipe end engaging portion 100 of the pipe stopper. The other arm 66 has an arcuate semi-cylindrical pressure member 106 fixed to its outer end adapted to engage the pipe 49 to clamp it to the extension 105, the pressure in the pipe, after valve 104 is closed, serving to maintain an effective seal in the tapered bore 101 of the device after it is clamped on the pipe by the apparatus as described. A pressure hose may be coupled to hose connector 104a and with valve 104, pressure may be applied to test the patched line. The end stopper can also be used for stopping flow if squeezer is not available by opening valve 104 to relieve pressure while applying the stopper to the end of the pipe, and then shutting off the valve.

In some instances some leaks 62 may be repaired "hot," but that is with pressure in the line 49. This can be readily done by cleaning and doping the area of the pipe adjacent the break and the inside of the patching member 64 and then clamping the patch in place over the break. The clamp arrangement of FIGS. 8 and 9 has ample capacity to perform the operation even though pressure is escaping from the break at the time of application of the patch to the pipe.

Figure 14:
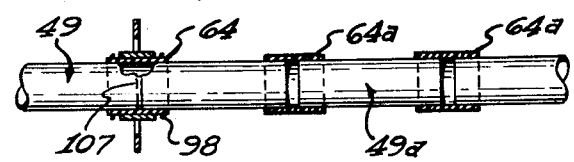
FIG. 14 shows the pipe of FIG. 13 fully repaired.

After a suitable new piece of pipe 49a has been inserted in place of the damaged or destroyed section, FIG. 14, and couplings 64a suitably applied, it is desirable to apply a patch over the squeezed portion 107 to be sure any minor fissures or cracks which may have developed in the pipe during the squeezing operation are positively sealed and the pipe restored to cylindrical shape again.

The end stopper or pipe stopper 99 is used by the trouble man so he can remove his squeezer and be ready to use it for another emergency as end stoppers are much cheaper than the pipe squeezers. After the end stopper has been applied and the pipe squeezer removed as recited above, the repair crew then completes the pipe repair. This is done by preferably wrapping the pipe with a few turns of glass tape and applying the pipe squeezer over the glass tape and squeezing the pipe off. The glass tape tends to protect the pipe from cracking and fissures during the squeezing operation. The end stopper is then removed and the pipe repaired as shown in FIG. 14. The squeezer and glass tape are then removed and a protective patch applied to the squeezed portion of the pipe to complete the job.

While the method herein disclosed and described constitutes a preferred form of the invention, it is also to be understood that the method is capable of alteration without departing from the spirit of the invention and that such alteration and commercial adaptation of the method as fall within the scope of the appended claims are intended to be included herein.

Having thus fully set forth and described this invention what is claimed and desired to be obtained by United States Letters Patent is:

1. The method of controlling the flow in and repairing plastic pipe comprising the steps of:
    (a) squeezing off a plastic pipe by applying a sharp line of pressure laterally of the pipe from diametrically opposite sides in a plane perpendicular to the pipe axis and to a spaced accurate parallel distance apart each side of the pipe axis equal to substantially twice the wall thickness of the pipe,
    (b) repairing the damaged portion of said pipe while thus squeezed off to arrest flow therein by applying a longitudinally split cylindrical patch thereto by first engaging an intermediate portion of the bore diametrically opposite the split of said patch against said pipe and progressively wrapping each semi-cylindrical portion of said patch around opposite sides of said pipe toward the split in said patch,
    (c) applying means to secure said patch on said pipe after applying said patch as recited in item (b),
    (d) releasing said squeezing off pressure from said pipe,
    (e) and finally applying a longitudinally split cylindrical patch to said squeezed portion of said pipe by first engaging an intermediate portion of the bore diametrically opposite the split of said patch against said pipe at the squeezed portion and progressively wrapping the semi-cylindrical portions of said patch around opposite sides of said squeezed portion toward the split in said patch while at the same time restoring said squeezed portion of said pipe to its original true cylindrical shape.

2. The method of controlling the flow in and repairing plastic pipe comprising the steps of:
    (a) squeezing off a plastic pipe by applying a sharp line of pressure laterally of the pipe from diametrically opposite sides in a plane perpendicular to the pipe axis and to a spaced accurate parallel distance apart each side of the pipe axis equal to substantially twice the wall thickness of the pipe,
    (b) repairing the damaged portion of said pipe while thus squeezed off to arrest flow therein by applying a longitudinally split cylindrical patch thereto by first engaging an intermediate portion of the bore diametrically opposite the split of said patch against said pipe and progressively wrapping each semi-cylindrical portion of said patch around opposite sides of said pipe toward the split in said patch,
    (c) applying means to secure said patch on said pipe after applying said patch as recited in item (b),
    (d) releasing said squeezing off pressure from said pipe,
    (e) applying a longitudinally split cylindrical patch to said squeezed portion of said pipe by first engaging an intermediate portion of the bore diametrically opposite the split of said patch against said pipe at the squeezed portion and progressively wrapping the semi-cylindrical portions of said patch around opposite sides of said squeezed portion toward the split in said patch while at the same time restoring said squeezed portion of said pipe to its original true cylindrical shape,
    (f) and finally applying means to secure said patch on the squeezed portion of said pipe after applying said patch as recited in item (e).

3. The method of controlling the flow in and repairing plastic pipe comprising the steps of:
    (a) wrapping a protective coating of glass tape on the plastic pipe portion to be squeezed,
    (b) squeezing off the plastic pipe by applying a sharp line of pressure laterally on the glass tape on said pipe from diametrically opposite sides in a plane perpendicular to the pipe axis and to a spaced accurate parallel distance apart each side of the pipe axis equal to substantially twice the wall thickness of the pipe,
    (c) repairing the damaged portion of said pipe while thus squeezed off to arrest flow therein by applying a longitudinally split cylindrical patch thereto by first engaging an intermediate portion of the bore diametrically opposite the split of said patch against said pipe and progressively wrapping each semi-cylindrical portion of said patch around opposite sides of said pipe toward the split in said patch,
    (d) applying means to secure said patch on said pipe after said patch as recited in item (c),
    (e) and finally releasing said squeezing off pressure from said pipe.

4. The method of controlling the flow in and repairing plastic pipe comprising the steps of:
    (a) wrapping a protective coating of glass tape on the plastic pipe portion to be squeezed,
    (b) squeezing off the plastic pipe by applying a sharp line of pressure laterally on the glass tape on said pipe from diametrically opposite sides in a plane perpendicular to the pipe axis and to a spaced accurate parallel distance apart each side of the pipe axis equal to substantially twice the wall thickness of the pipe.
    (c) repairing the damaged portion of said pipe while thus squeezed off to arrest flow therein by applying a longitudinally split cylindrical path thereto by first engaging an intermediate portion of the bore diametrically opposite the split of said patch against said pipe and progressively wrapping each semi-cylindrical portion of said patch around opposite sides of said pipe toward the split in said patch, (d) applying means to secure said patch on said pipe after said patch as recited in item (c), (e) releasing said squeezing off pressure from said pipe, (f) removing said glass tape from the squeezed portion of said plastic pipe, (g) and finally applying a longitudinally split cylindrical patch to said squeezed portion of said pipe by first engaging an intermediate portion of the bore diametrically opposite the split of said patch against said pipe at the squeezed portion and progressively wrapping the semi-cylindrical portion of said patch around opposite sides of said squeezed portion toward the split in said patch while at the same time restoring said squeezed portion of said pipe to its original true cylindrical shape.

References Cited by the Examiner

UNITED STATES PATENTS

| | | | |
|---|---|---|---|
| 597,443 | 1/98 | Thomas | 251—8 |
| 698,874 | 4/02 | Towers | 251—7 |
| 775,124 | 11/04 | Christman | 138—89 |
| 1,181,910 | 5/16 | McGilvray | 137—15 |
| 1,882,095 | 10/32 | Reggitts | 81—5.1 |
| 2,002,383 | 5/35 | Witt | 137—334 XR |
| 2,167,952 | 8/39 | Jordan | 251—7 |
| 2,171,576 | 9/39 | Larry | 137—15 |
| 2,212,733 | 8/40 | Grigsby | 251—8 |
| 2,709,937 | 6/55 | McVey | 81—5.1 |
| 2,827,257 | 3/58 | Becker | 251—9 |
| 2,924,546 | 2/60 | Shaw | 137—315 XR |
| 2,985,192 | 5/61 | Taylor | 251—7 XR |

ISADOR WEIL, *Primary Examiner.*